(12) United States Patent
Weber et al.

(10) Patent No.: US 8,447,986 B2
(45) Date of Patent: May 21, 2013

(54) ACCESSING RESTRICTED CONTENT BASED ON PROXIMITY

(75) Inventors: Karon A. Weber, Kirkland, WA (US); Thaddeus C. Pritchett, Edmonds, WA (US); Cesare John Saretto, Seattle, WA (US); Boyd Cannon Multerer, Bellevue, WA (US); Arnold Blinn, Hunts Point, WA (US)

(73) Assignee: Microsoft Corporation, Redmond, WA (US)

( * ) Notice: Subject to any disclaimer, the term of this patent is extended or adjusted under 35 U.S.C. 154(b) by 294 days.

(21) Appl. No.: 12/821,321

(22) Filed: Jun. 23, 2010

(65) Prior Publication Data

US 2011/0320819 A1    Dec. 29, 2011

(51) Int. Cl.
*H04L 9/32* (2006.01)
(52) U.S. Cl.
CPC ................................. *H04L 9/32* (2013.01)
USPC ............................................. 713/176
(58) Field of Classification Search
USPC ............................................. 713/176
See application file for complete search history.

(56) References Cited

U.S. PATENT DOCUMENTS

| | | | |
|---|---|---|---|
| 2006/0015580 A1 | 1/2006 | Gabriel et al. | |
| 2006/0087407 A1* | 4/2006 | Stewart et al. | 340/10.52 |
| 2006/0291455 A1 | 12/2006 | Katz et al. | |
| 2007/0005503 A1* | 1/2007 | Engstrom et al. | 705/59 |
| 2007/0067620 A1 | 3/2007 | Jevans | |
| 2008/0301441 A1 | 12/2008 | Calman et al. | |
| 2009/0183010 A1 | 7/2009 | Schnell et al. | |

OTHER PUBLICATIONS

Smolyanskiy, "Behind Live Mesh: Authorization and Encryption", Live Mesh, MSDN Blogs, May 29, 2008, http://blogs.msdn.com/livemesh/archive/2008/05/29/behind-live-mesh-authorization-and-encryption.aspx.
Juneja, "Security in the Cloud", Express Computer, Feb. 8, 2010, website, http://www.expresscomputeronline.com/20100208/coverstory01.shtml.
IBM, "The IBM Vision of a Smarter Home Enabled by Cloud Technology", IBM Sales & Distribution, White Paper, Global Electronics Industry, Jan. 2010, http://www.ibm.com/smarterplanet/global/files/uk_uk_en_cloud_a_smarter_home_enabled_by_cloud_computing.pdf?ca=content_body&met=uk_smarterplanet_cloud_computing_ideas&re=spc.
Small, VeriSign Boasts Secure Authentication in the Cloud, SC Magazine website, Nov. 6, 2008, http://www.securecomputing.net.au/News/127663,verisign-boasts-secure-authentication-in-the-cloud.aspx.

* cited by examiner

*Primary Examiner* — Jacob Lipman
(74) *Attorney, Agent, or Firm* — Vierra Magen Marcus LLP

(57) ABSTRACT

A license to use content (e.g., a movie, song, application, etc.) is provided to a consumer. The license allows for use of the content by the device the consumer is using (e.g., logged into) and devices near the device the consumer is using. For example, a first computing device obtains a license to restricted content. A second computing device obtains a copy of the restricted content; however, the second computing device is not licensed to use the content and may not be able to access the content because the content is encrypted or otherwise restricted. The first computing device is brought into proximity with the second computing device. In response to detecting that the first computing device is in proximity with the second computing device, the second computing device is provided with legal access to the restricted content. The second computing device can then decrypt (or otherwise access) and play the content.

19 Claims, 11 Drawing Sheets

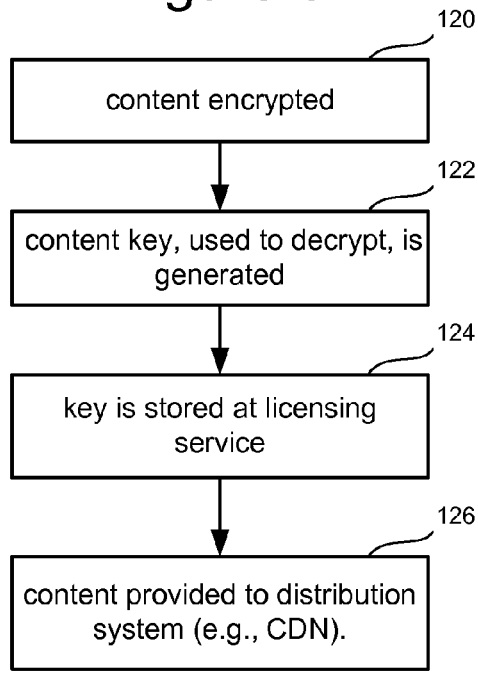
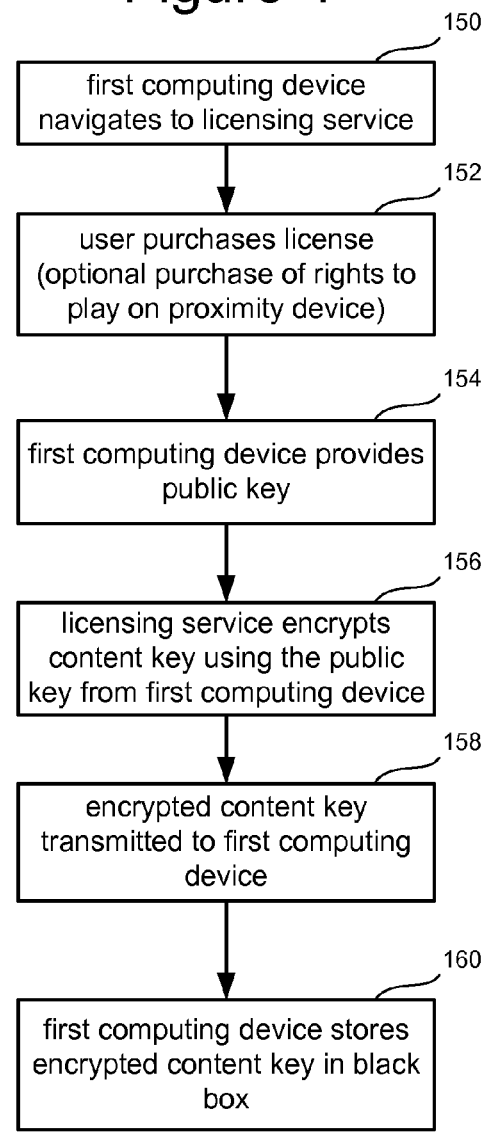

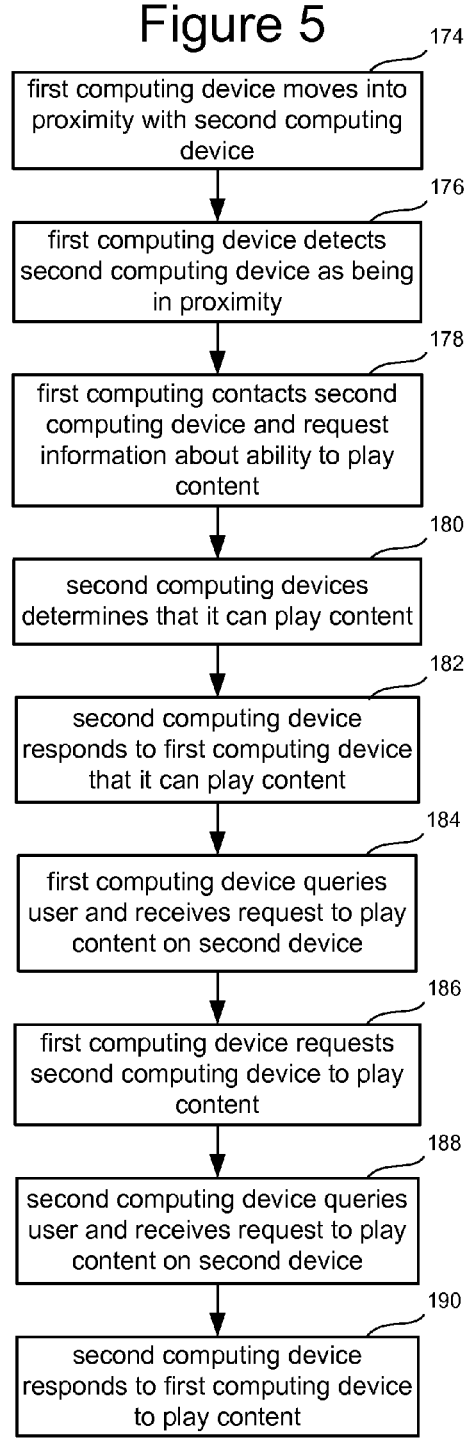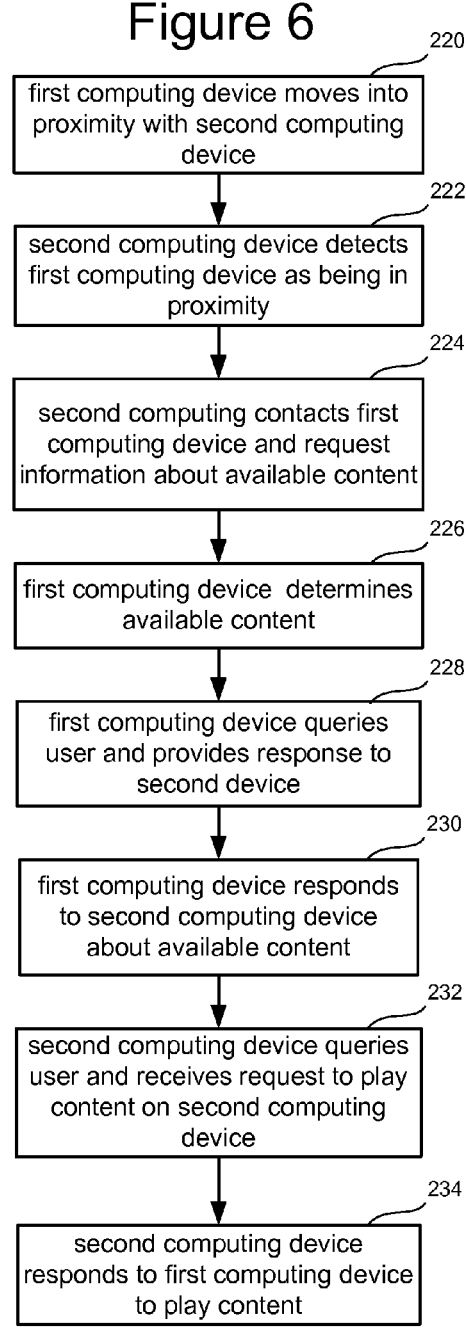

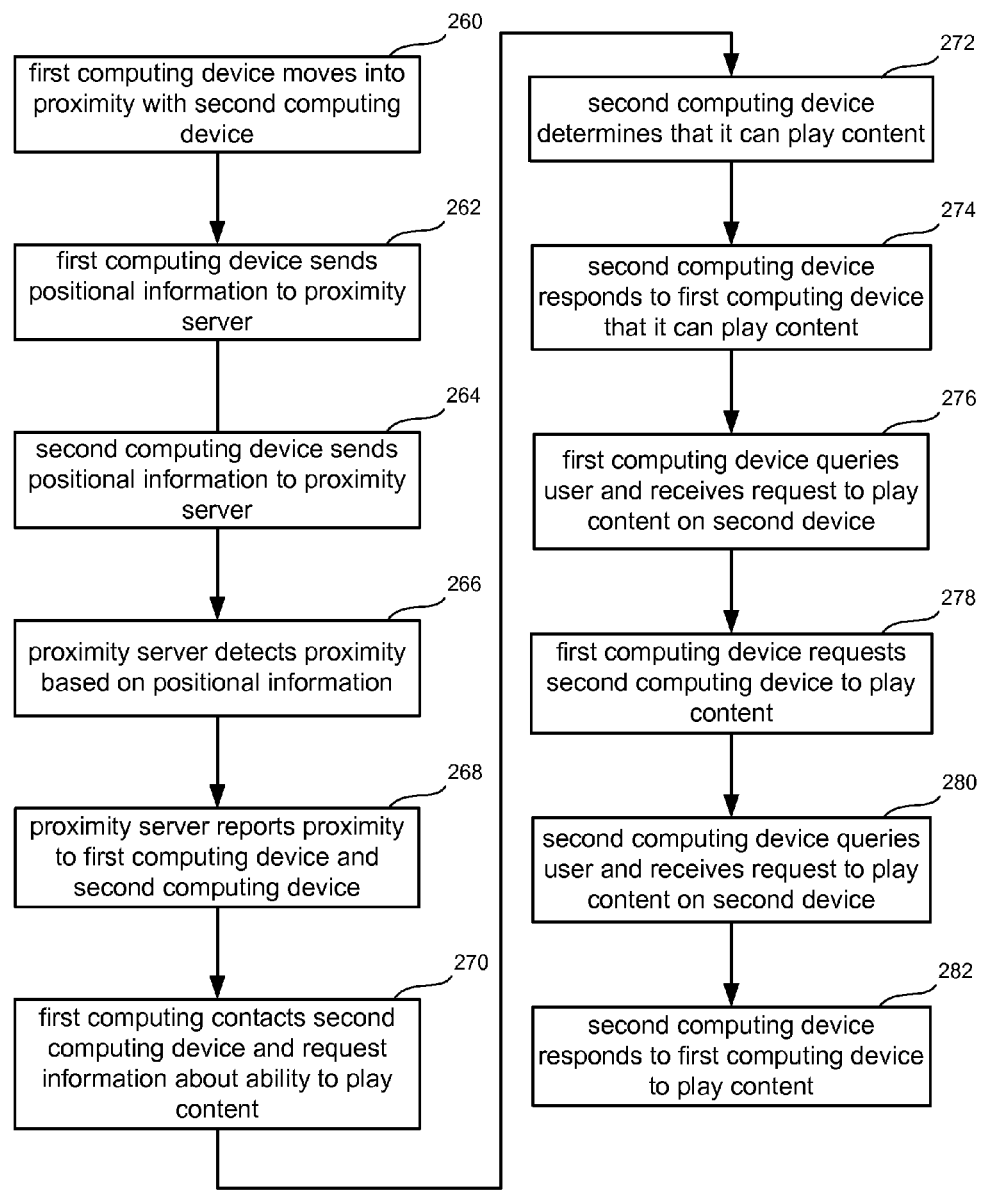

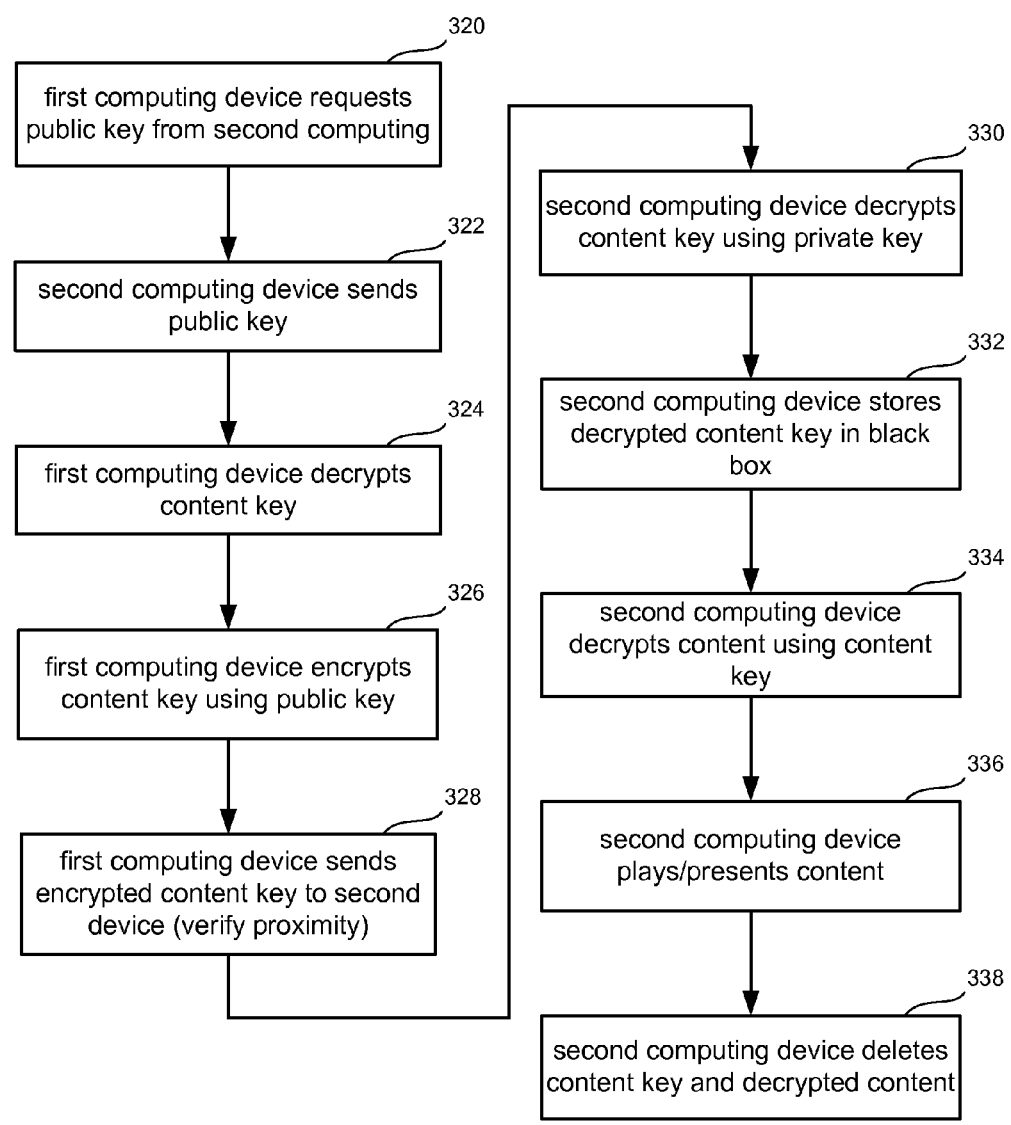

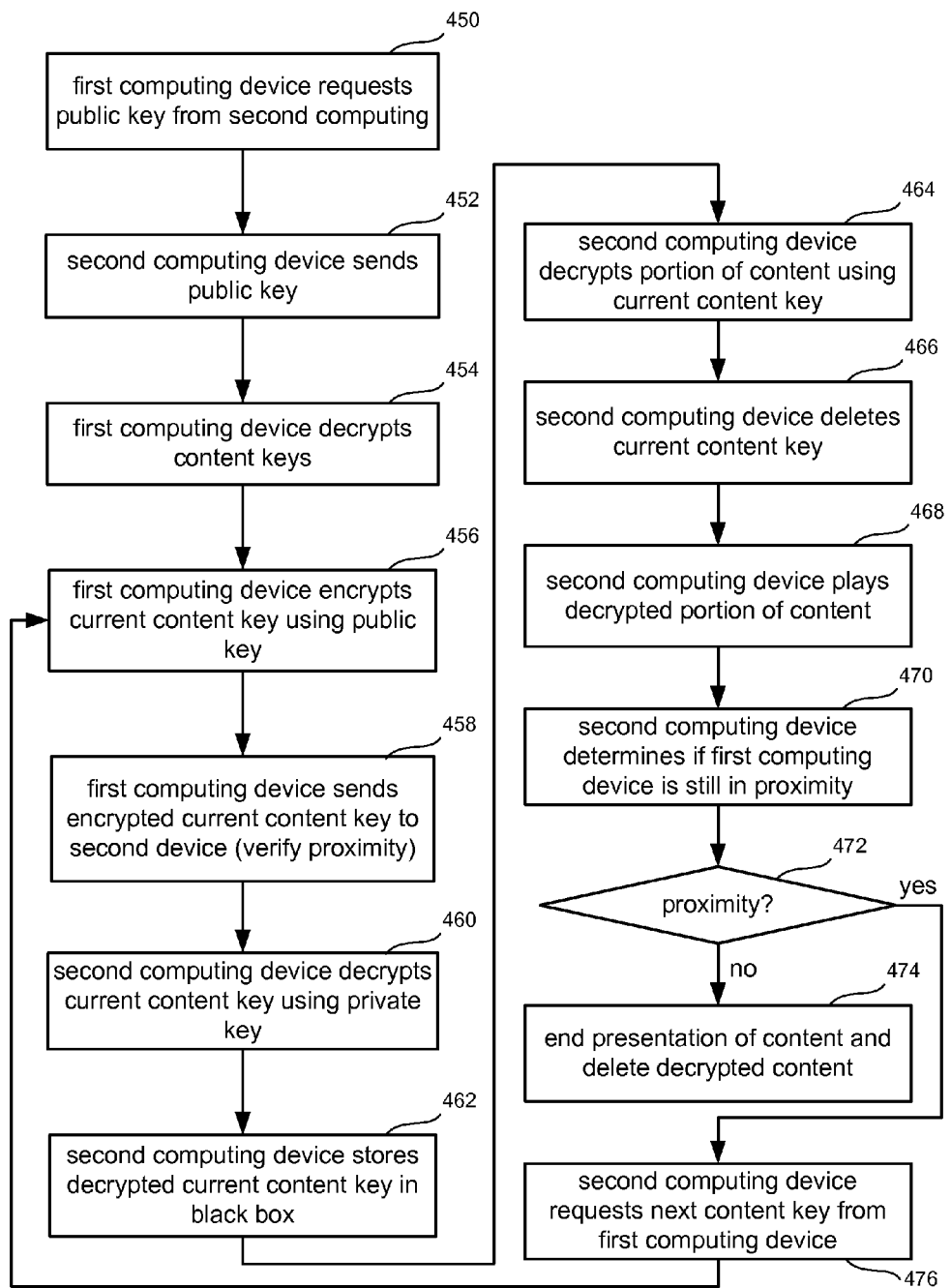

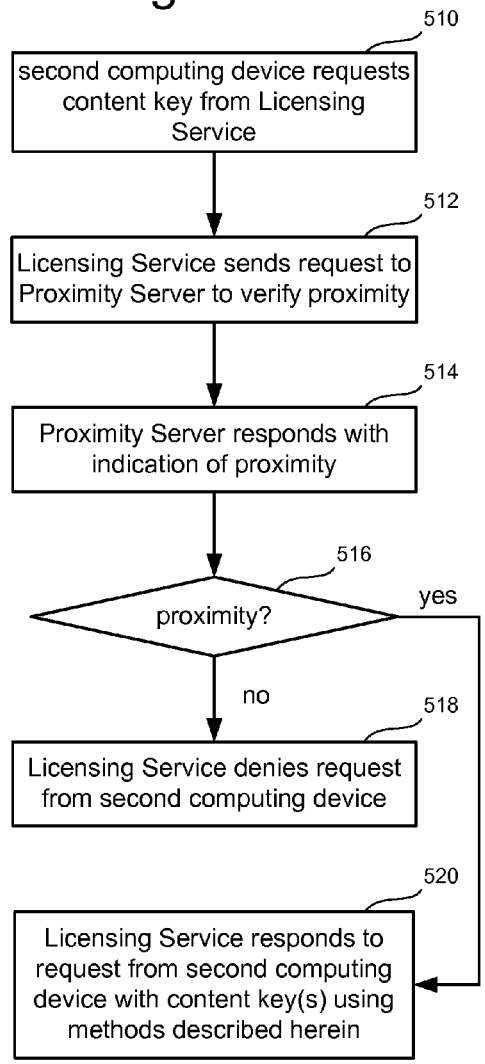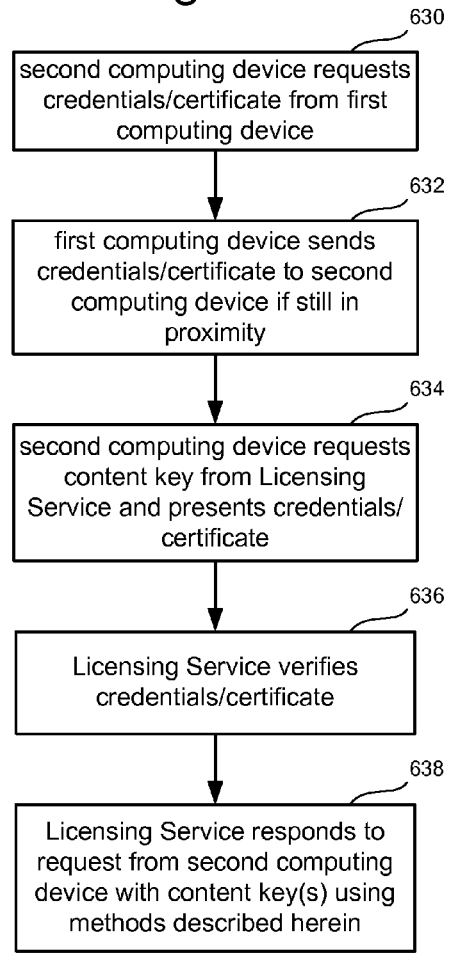

ACCESSING RESTRICTED CONTENT BASED ON PROXIMITY

BACKGROUND

People subscribe to or otherwise acquire various services related to content, such as video or music on demand, applications/services on a subscription basis, video rentals, music/video purchases, etc. Currently, many of these services require the content to be tied to a particular device. This creates a problem when the consumer, who properly paid for the content, wants to access the content on a different device. For example, a person who is traveling may order a movie for their mobile computing device (e.g., laptop, tablet or cellular telephone). However, if the person did not watch the movie on their trip and they are now at a friend's house who has a large television, the person may want to watch the movie with their friend on their friend's large television. Currently, there is no way easy way to play the content on their friend's television without physically connecting the person's mobile device to the television, which may not be possible if the two devices do not have the proper ports.

SUMMARY

A system is provided that allows an unlicensed device to play restricted content using a license of a licensed device based on the unlicensed device being in proximity to the licensed device. For example, a first device obtains a license for encrypted content available on a network. In response to detecting that a second device is in proximity to the first device, the second device is provided with legal access to the encrypted content. The second device can then legally decrypt and play the content.

One embodiment includes obtaining restricted content at the second computing device, determining that the second computing device is in proximity to the first computing device, receiving the right to access the content at the second computing device while the second computing device is in proximity to the first computing device and in response to the second computing device being in proximity to the first computing device, and presenting the content using the second computing device based on the right to access.

One embodiment includes one or more processor readable storage devices having processor readable code stored thereon. The processor readable code programs one or more processors to perform a method. The method includes acquiring a right to access content at a first computing device, identifying that the first computing device is in proximity to a second computing device, and providing the right to access the content to the second computing device while the first computing device is in proximity to the second computing device and in response to the first computing device being in proximity to the second computing device.

One embodiment includes a first computing device and a second computing device. The first computing device acquires a right to access content from an entity via a network. The second computing device receives an access right to access the content in response to the first computing device being in proximity to the second computing device. The second computing device accesses the content using the access right.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

BRIEF DESCRIPTION OF THE DRAWINGS

FIG. 3 is a flow chart describing one embodiment of a process for making content available.

FIG. 4 is a flow chart describing one embodiment of a process for acquiring a license to content.

FIG. 5 is a flow chart describing one embodiment of a process for detecting proximity.

FIG. 6 is a flow chart describing one embodiment or process for detecting proximity.

FIG. 7 is a flow chart describing one embodiment of a process for detecting proximity.

FIG. 8 is a flow chart describing one embodiment of a process for playing content based on a license associated with a device in proximity.

FIG. 11 is a flow chart describing one embodiment of a process for playing content based on a license associated with a device in proximity.

FIG. 12 is a flow chart describing one embodiment of a process for playing content based on a license associated with a device in proximity.

FIG. 13 is a flow chart describing one embodiment of a process for playing content based on a license associated with a device in proximity.

DETAILED DESCRIPTION

Figure 1:
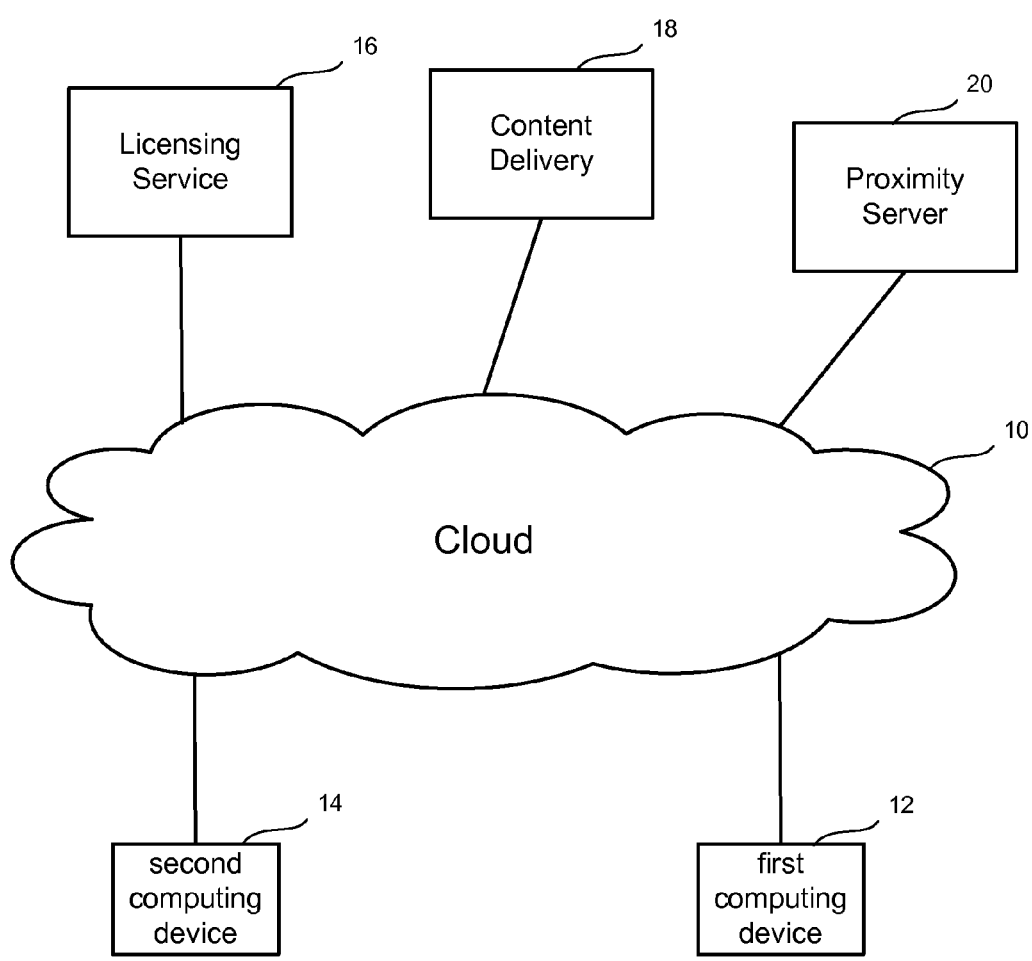
FIG. 1 is a block diagram depicting the one embodiment of the components for implementing the system described herein.

A system is described that legally allows an unlicensed device to play restricted content using a license of a licensed device based on the unlicensed device being in proximity to the licensed device. This concept can be explained with the use of FIG. 1, which is a block diagram describing various computing devices that are in communication with each other via cloud 10. In one embodiment, cloud 10 could be the Internet, another type of global network, other type of network, or other communication means. FIG. 1 shows first computing device 12, second computing device 14, Licensing Service 16, Content Delivery service 18 and Proximity Server 20 all in communication with cloud 10. Therefore, all five devices (12, 14, 16, 18 and 20) can communicate with each other via cloud 10 using means known in the art. Communication can be via wired or wireless technologies, or a combination of wired and wireless technologies. No specific type of communication technology is required.

First computing device 12 and second computing device 14 can be any type of mobile or non-mobile computing device.

For example, first computing device 12 and second computing device 14 can be a desktop computer, laptop computer, cellular telephone, television/set top box, video game console, automobile computing device, smart appliance, etc. No specific type of computing device is required. Licensing Service 16 includes one or more servers that implement a licensing service. Licensing Service 16 provides licenses (e.g., the right to access, play, distribute, exhibit, etc.) various content. Examples of content include video, audio, video in combination with audio, still images, software, applications, services, etc. For purposes of discussion, the content that is licensed by Licensing Service 16 will be referred to as restricted content since a license is needed to properly use the content. Content Delivery service 18 includes one or more servers that make up a service for delivering content. In one example, Content Delivery service 18 is a content delivery network ("CDN"). In some embodiments, the content licensed by Licensing Service 16 and provided to Content Delivery service 18 is encrypted. In this manner, entities that have access to cloud 10 can download the encrypted content from Content Delivery service 18. In order to access and play that content, an entity would need to acquire a license from Licensing Service 16. Once obtaining the license, the entity will obtain the ability to access the encrypted content downloaded from Content Delivery service 18. Note that often this content is encrypted with one key so it can be put on a CDN. This is a strong key. A license contains this key, but encrypted to a particular user and/or device.

Technology is described herein for allowing devices to have access to restricted content based on proximity to other devices. In some embodiments, the various devices will decide on their own whether they are in the appropriate proximity. In other embodiments, Proximity Server 20 (which can be one or more servers) is used to determine, or help determine, whether two or more devices are in proximity with each other.

For example purposes, the discussion below will assume that first computing device 12 properly obtained a license from Licensing Service 16 for an example set of restricted content stored at Content Delivery service 18. In the examples described below, second computing device 14 has not obtained a license from Licensing Service 16 for the restricted content; however, the owner or user of first computing device 12 who paid for and properly obtained the license from Licensing Service 16 wishes to access and play the content on second computing device 14. The second computing device 14 may be associated with a different user. Therefore, in some embodiments, first computing device 12 is operating using a first user profile in response to the first user authenticating and second computing device 14 is operating under a second user profile in response to a second user (different from the first user) authenticating. In other embodiments, the same user can be logged into (authenticated in) both first computing device 12 and second computing device 14. The technology described herein allows second computing device 14 to access and play the restricted content that has been licensed to first computing device 12 based on and in response to second computing device 14 being in proximity to first computing device 12.

In some embodiment, the different computing devices are authenticated with two logins. However, other types of relationships and licenses which can be established. For example, a phone can talk to a TV without authenticating each time there is a connection. For example, a 1:1 mapping can be established. For some cases, a user may choose a one-time relationship—so it has to have someone re-authenticate each time they connect. This would prevent having instant access to media, without granting permission. The license types could also help with this, as a content holder could say you can have instant access to my music, but need to request permission to play a movie or game when I am at your house. Another example is that a user could white list certain assets and black list assets—so others can only see what the user want you to see and protect from disclosing all purchases. A social graph can also be used to determine permissions or media preferences.

The definition of proximity is relative. In one embodiment, proximity means in the same room. In another embodiment, proximity means in the same building. In other embodiments, proximity means within a predefined distance from each other, where that distance is defined based on the particular implementation. In one example, the predefined distance is fifteen feet; however, the technology is not limited to any particular distance and other values (more or less than fifteen feet) can be used. In one embodiment, devices are in proximity if both devices are on the same subnet of an IP network, and IP traffic between them traverses less than or equal to 3 hops. In some embodiment, the radius of proximity can be set on a per user basis, and the radius for a given user can change based on location and time of day. In another embodiment, the license for content can be restricted on a per content item basis or certain content can only be used at certain locations.

Figure 2:
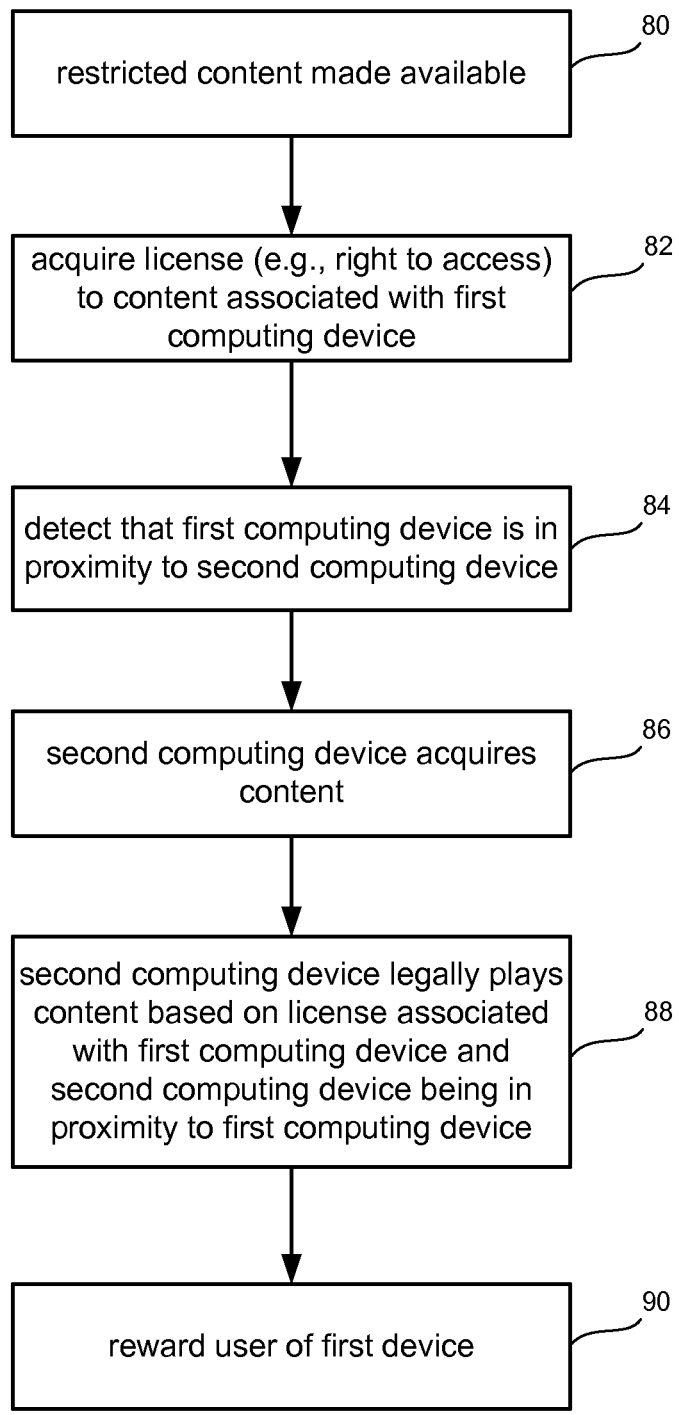
FIG. 2 is a flow chart describing one embodiment of a process for allowing an unlicensed device to play restricted content using the license of a license device based on the unlicensed device being in proximity to the licensed device.

FIG. 2 is a flow chart describing the operation of the components of FIG. 1 that allows second computing device 14 to access restricted content based on and in response to being in proximity to first computing device 12. In step 80 of FIG. 2, restricted content is made available. For example, the content can be encrypted and stored on Content Delivery service 18 for download by appropriate users. In step 82, a device can acquire a license to the restricted content. For example, the acquired license can be associated with first computing device 12. In step 84, it is detected that first computing device 12 is in proximity to second computing device 14. In step 86, second computing device 14 will acquire a copy of all or a portion of the restricted content. In step 88, second computing device 14 will legally access and play the restricted content (from step 86) based on the license associated with first computing device 12 and based on second computing device being in proximity to first computing device 12. Note that the order of the steps can be different than as depicted in FIG. 2. For example, second computing device 14 can acquire a copy of the restricted content during step 88 as well as before performing step 88. Additionally, the detection of the devices being in proximity can occur after step 86, before step 82, etc.

In some embodiments, the user of the first device will receive a reward (see step 90) for providing the content to second computing device 14. This is a reward for encouraging the promotion of the content. For example, frequent user points can be awarded, gift points can be awarded, discounts can be awarded, etc. The idea of this optional step 90 is to provide an incentive for different users to promote the content of various distributors. One embodiment includes an optional "logging service" that keeps up with how many times a device or user should be rewarded. It knows what users are sharing what content from which devices to which devices. The logs can be used to reward good customers with incentives. They can be used to measure usage data of the system overall.

FIG. 3 is a flow chart describing the process for making restricted content available. For example, the process of FIG. 3 is one example implementation of step 80 of FIG. 2. In step 120 of FIG. 3, content is encrypted. For example, a file containing a movie can be encrypted by any of the various encryption technologies known in the art. In step 122, a key (hereinafter called the content key) that can be used to decrypt the encrypted content is generated. In some embodiments, the content key can be generated prior to the encryption of step 120. In step 124, the content key for decryption is stored with Licensing Service 16. In step 126, the encrypted content is provided to a distribution system such as Content Delivery service 18 (e.g., the CDN). In one embodiment, the encryption of step 120 is performed by Licensing Service 16. In other embodiments, the encryption can be performed by the producer of the content, or another entity.

FIG. 4 is a flow chart describing one embodiment of a process for acquiring a license to a content. For example, the process of FIG. 4 is one example implementation of step 82 of FIG. 2. In step 150 of FIG. 4, first computing device 12 navigates to Licensing Service 16. For example, a user operating a browser will navigate to the appropriate web site for Licensing Service 16. In other embodiments, a telephone can be used to call Licensing Service 16. Other means for contacting licensing service can also be used. No particular means for contacting licensing service is required for the technology described herein. In step 152, the user of first computing device 12 will purchase a license to the restricted content (e.g., the movie of interest). In one example, the user will have the option of purchasing different types of licenses. One type of license will allow the content to only be played on first computing device 12. A second type of license may allow the user to play the content on first computing device 12 or play the content on a different computing device 14 when the different computing device 14 is in proximity to first computing device 12. Other types of licenses can also be used.

In step 154, first computing device 12 provides Licensing Service 16 with a public key for first computing device 12. In step 156, Licensing Service 16 encrypts the content key that was generated in step 122 using the public key from first computing device 12. In step 158, the encrypted content key is transmitted to first computing device 12 via cloud 10 (or other communication means). In step 160, first computing device 12 will store the encrypted content key in a black box within first computing device 12. The black box contains the device's private key and will never give that up. In one embodiment, the black box in first computing device 12 is implemented in software as a secure storage location in memory, on a hard drive, on semiconductor nonvolatile storage, or other storage devices. If a user were to desire to access and view the content on first computing device 12, first computing device 12 would use its private key to decrypt the content key, and then use the content key to decrypt the content (which it would download from Content Delivery service 18). After the restricted content is decrypted using the content key, the user can access and play the content (e.g., watch the movie) on computing device 12. In some embodiments, content is decrypted in chunks as playback occurs, not all at once.

There may be a circumstance where the user wants to access the content on device other than first computing device 12. For example, if the user obtained a license to watch a movie on the user's cell phone for a trip and never had a chance to watch that movie during the trip, the user may now want to watch the movie on a large television. Using the technology described herein, when the user brings the user's cell phone in close proximity to the television, a set top box connected to the television or video game console connected to the television, the movie will be played on the television based on the rights obtained for the cell phone and in response to the cell phone being in proximity to the set top box, video game console and/or television. In some embodiments, the television will play the same version of the content as the cell phone, while in other embodiments the television will play a different version of the content (e.g., such as a higher resolution version).

FIGS. 5, 6 and 7 are flow charts describing different embodiments for detecting that the first computing device 12 is in proximity to the second computing device 14. For example, the processes of FIGS. 5, 6 and 7 are example implementations of step 84 of FIG. 2. Each of the three embodiments, described in the flow charts of FIGS. 5, 6 and 7 will be described separately.

In step 174 of FIG. 5, first computing device 12 moves into proximity with second computing device 14. In step 176, first computing device 12 detects second computing device 14 as being in proximity to first computing device 12. In step 178, first computing device 12 will contact second computing device 14 and request information from second computing device 14 about its ability to play the content. There is no reason to try to transfer rights to second computing device 14 if second computing device 14 is unable to play the specific type of content. In response to first computing device 12, second computing device 14 will determine that it can play the content in step 180. In step 182, second computing device 14 will respond to first computing device 12 that it can play the content. In step 184, first computing device 12 informs the user that second computing device 14 is in proximity and can play the content. The user of first computing device 12 will either indicate (e.g., clicking on a button, or some other user interface action) that the user wants to play the content on second computing device 14 or does not want to play the content on second computing device 14. As part of step 184, first computing device 12 receives the request/command from the user to play the content on the second computing device 14. In step 186, first computing device 12 requests that second computing device 12 play the restricted content. In step 188, second computing device 14 queries the user of second computing device 14 to indicate that first computing device 12 is in proximity and has rights to certain restricted content, and asks whether the user of second computing device 24 wishes to play that content on second computing device 24. As part of step 188, the user will indicate (via a UI) to the second computing device whether to play or not play the content. If the user wants to play the content on second computing device 14, then at step 190 second computing device 14 respond to first computing device 12 that second computing device 14 wishes to play the content for which first computing device 12 has a license. In some embodiments, step 188 is optional as these types of connected media devices are often configured such that they will automatically play back content from any device on the network, or from specific pre-approved devices.

There are many ways to determine whether the two computing devices are in proximity. For example, the devices can use WiFi technology, Bluetooth technology, GPS technology, pseudolite technology, image technology, as well as other technologies. In one example, a computing device can include a GPS receiver for receiving GPS location information. The computing device will use that GPS information to determine its location. In another embodiment, pseudolite technology can be used in the same manner that GPS technology is used. If two devices know their GPS-derived location, then it can be determined whether they are in proximity to each other. In another embodiment Bluetooth technology can be used. For example, a computing device can receive a Bluetooth signal from another computing device and therefore identify whether the other computing device is in proximity. In another embodiment, a computing device can search for all WiFi networks in the area and record the signal strength for each of those WiFi networks. The list of detectable WiFi networks and signal strengths provides a WiFi signature which can comprise positional information. Based on that positional information from one or more computing devices, it can be determined whether the multiple computing devices are in proximity to each other. In another alternative, one of the computing devices can be a WiFi router/access point and the other computing device can simply measure the signal strength to determine whether it is within proximity of the first computing device.

In another embodiment, one of the computing devices can take one or more photographs of its surroundings. These photos can be matched against a known set of photos in the environment in order to detect location within the environment. Another embodiment that uses photo technology includes taking photos of a computing device's environment and determining whether it can detect an image of the other computing device in any one of the photographs.

Additional information about acquiring positional information by determining what devices are in proximity can be found in the U.S. Patent Application Publication 2006/0046709, Ser. No. 10/880,051, filed on Jun. 29, 2004, published on Mar. 2, 2006, Krumm, et al., "Proximity Detection Using Wireless Signal Strengths," and U.S. Patent Application Publication 2007/0202887, Ser. No. 11/427,957, filed Jun. 30, 2006, published Aug. 30, 2007, "Determining Physical Location Based Upon Received Signals," both of which are incorporated herein by reference in their entirety. Other means for determining whether devices are in proximity to each other can also be used.

In the above discussion of FIG. 5, first computing device 12 is the computing device that determines that first computing device 12 is in proximity to second computing device 14. FIG. 6 describes an embodiment where it is second computing device 14 which determines that first computing device 12 and second computing device 14 are in proximity to each other. In step 220 of FIG. 6, first computing device 12 moves into proximity with second computing device 14. Although the examples of steps 174 and 220 contemplate first computing device 12 moving into proximity with second computing device 14, it is equally possible that it is second computing device 14 which moves into proximity with first computing device 12. In step 222, second computing device 14 detects that first computing device 12 is in proximity using any of the technologies described above. In step 224, second computing device 14 contacts first computing devices 12 and requests information about available content. In step 226, first computing device 12 determines what content is available through licenses that it possesses. In step 228, first computing device 12 queries the user of first computing device 12 indicating that second computing device 14 has asked about available content and first computing device 12 lists to the user the content available. The user will select zero, one or more than one items of content to provide to second computing device 14. In step 230, first computing device 12 responds to second computing device 14 about content available for second computing device 14. In step 232, second computing device 14 queries the user of second computing device 14 indicating the first computer device 12 is nearby and has the following items of content available for playing on second computing device 14. The user of second computing device 14 can select to play one of the items of content on second computing device 14. In step 234, second computing device 14 will respond to first computing device 12 indicating to first computing device 12 the content selected by the user for play on second computing device 14.

Note that the processes of FIGS. 5 and 6 contemplate that first computing device 12 communicates with second computing device 14. This communication can occur directly or indirectly. When occurring directly, the communication can occur via cloud 10 or via local communication means (e.g., WiFi, infrared, Blue Tooth, etc.). In one embodiment, first computing device is not physically connected to second computing device. When communicating indirectly, first computing device can communicate with second computing device 14 via Licensing Service 16, Content Delivery service 18, Proximity Server 20, a proxy server, other server, etc. No specific means for communication is required for the technology described herein.

FIG. 7 provides another embodiment for implementing step 84 of FIG. 2. The process of FIG. 7 includes an embodiment where a third party determines that the two computing devices are in proximity with each other. For example, Proximity Server 20 will determine that first computing device 12 is in proximity to second computing device 14. In step 260 of FIG. 7, first computing device 12 moves into proximity with second computing device 14. In step 262, first computing device 12 sends its positional information to proximity server 262. For example, first computing device 12 will sense positional information about itself based on data from its sensors. This positional information can include GPS location information, Bluetooth information (devices that can be detected), WiFi information (networks and signal strength), photographs, video etc. (see discussion above). In step 264, second computing device 14 will sense positional information using one or more of its sensors (e.g., GPS location information, Bluetooth information, WiFi information, photographs, video etc.). Second computing device 14 will send its positional information to proximity server 20. At this point, both computing devices have sent their positional information to Proximity Server 20. One advantage of a Proximity Server is that it can do cell tower triangulation. A server can have access to a large database of all cell towers from all cellular carriers. If a device sends the server all cell towers it currently sees along with their signal strengths, then the server can triangulate it to an approximate GPS coordinate. The device need not have GPS. A second device on a different cellular provider can do the same. If the devices are within acceptable range according to their approximated GPS coordinates, then playback can happen.

In step 266, Proximity Server 20 determines whether first computing device 12 is in proximity to second computing device 14 based on the positional information sent from both computing devices. In step 268, proximity server 20 will report to first computing device 12 and second computing device 14 whether they are in proximity with each other. In step 270, first computing device 12 will contact second computing device 14 (if they are in proximity to each other) and request information about the ability for second computing device 14 to play various content. This could be done by having both devices connect to a central service (may be the proximity service) and polling or getting pushed notification that another device is in proximity. Another embodiment might have the user hit a button on each device to broadcast/poll presence to prevent too much network chatter or overhead. In step 272, second computing device 14 will determine that it can play the content. In step 274, second computing device 14 will respond to first computing device 12 that it can play the content. In step 276, the first computing device 12 will query the user of the first computing device to indicate to the user that first computing device 12 is in proximity to second computing device 14 and lists the various content that can be transferred to second computing device 14. The user will select zero, one or more than one items of content to play on second computing device 14. In step 278, first computing device 12 sends a request to second computing device 14 to play the selected item of content. In step 280, second computing device 14 queries the user of second computing device 14 indicating that it is in proximity to computing device 1 and can play the selected item of content licensed to first computing device 12. The user of second computing device 14 can choose to play the content or not. If the user chooses to play the content, then at step 282 second computing device 14 will respond to first computing device 12 that it wishes to play the content.

FIGS. 8-13 are flow charts describing different embodiments for legally playing the content on second computing device 14 based on the license associated with first computing device 12 when the two computing devices are in proximity to each other. That is, each of the flow charts of FIGS. 8-13 are different embodiments of implementing step 88 of FIG. 2.

FIG. 8 describes an embodiment of step 88 of FIG. 12 in which first computing device 12 provides the content key to second computing device 14. As discussed above, when first computing device 12 obtained a license to the restricted content, Licensing Service 16 provides the content key to first computing device 12 in encrypted form. The content key can be decrypted by first computing device 12 using the private key for first computing device 12. First computing device 12 is not supposed to share its private key with second computing device 14. Additionally, first computing device 12 is not supposed to send the content key to another device in unencrypted form. Therefore, first computing device will re-encrypt the content key such that it can be unencrypted by second computing device 14. Therefore, in step 320 of FIG. 8, first computing device 12 requests second computing device 14 to send it the public key associated with second computing device 14. In step 322, the second computing device 14 will send its public key to first computing device 12. In step 324, first computing device 12 will decrypt the content key stored in its black box using the private key for first computing device 12. In step 326, the first computing device 12 will encrypt the content key (after decrypting it in step 324) using the public key for second computing device 14. In step 328, first computing device 12 sends the encrypted content key to second computing device 14. In some embodiments, first computing device 12 will verify that it is still in proximity with second computing device 14 at the time of sending the encrypted content key in step 328. In step 330, second computing device 14 decrypts the encrypted content key using the private key for second computing device 14. In step 332, second computing device 14 will store the decrypted content key in its black box. If the second device is a TV or fixed purpose device, then in some embodiments the entire device can be considered a black box. In that case, it would store the content key in volatile memory. In step 334, second computing device 14 will decrypt the content (acquired in step 86 of FIG. 2) using the decrypted content key. In some embodiments, the entire content is downloaded from Content Delivery service 18 before acquiring the decrypted content key. In other embodiments, the content can be downloaded in sections such that each section is decrypted immediately after being downloaded and the decrypted section of content is immediately deleted after being played. In step 336, second computing device 14 play the decrypted content. In step 338, second computing device 14 deletes the content key and the decrypted video.

Figure 9:
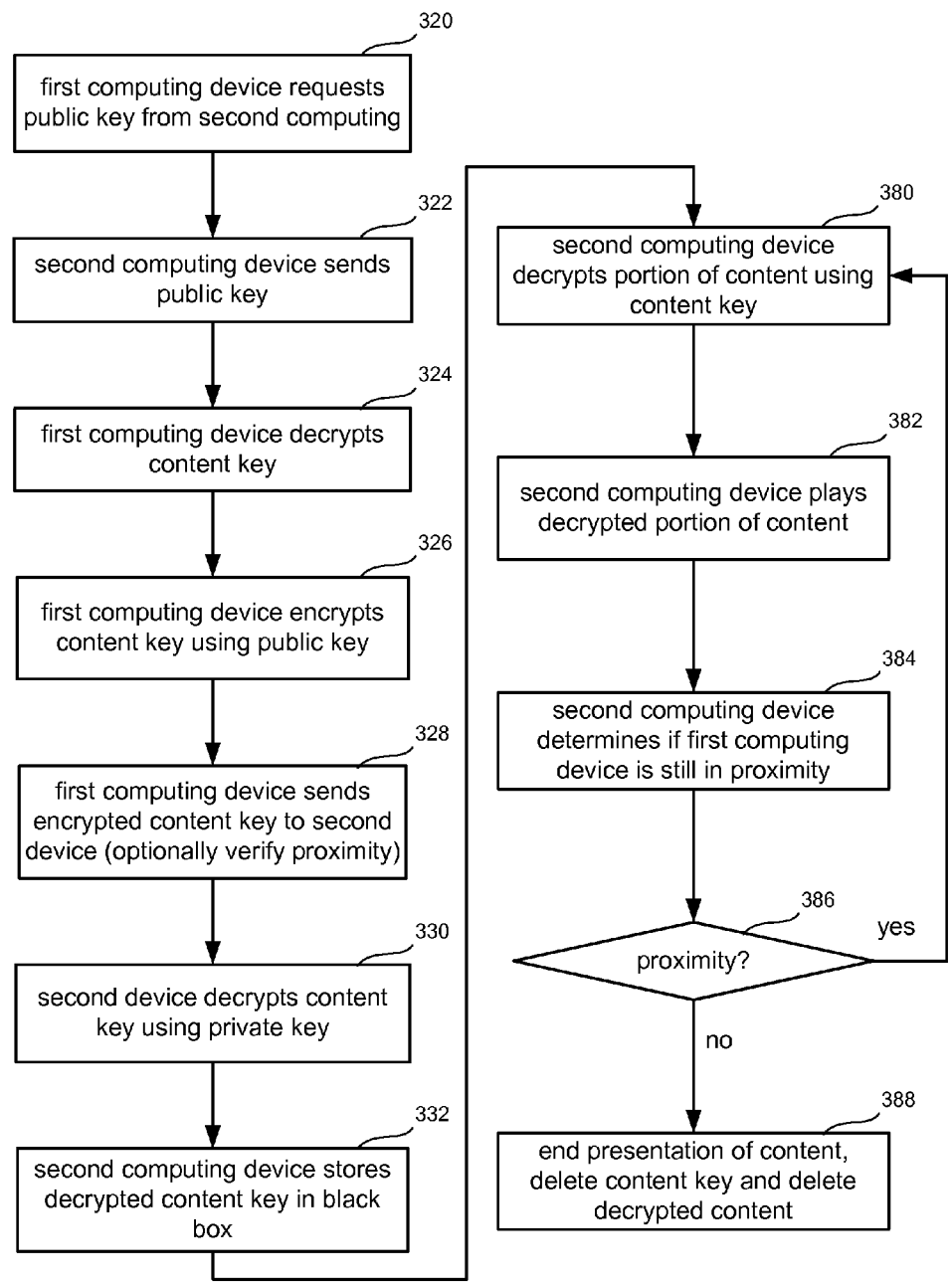
FIG. 9 is a flow chart describing one embodiment of a process for playing content based on a license associated with a device in proximity.

FIG. 9 is a flow chart describing another embodiment of playing the content (step 88 of FIG. 2), in which content is decrypted a portion at a time. If the two computing devices are no longer in proximity to each other, during playback/presentation of the content, computing device 14 will stop decrypting additional portions of the content. That is, second computing device will lose the right to access the content and will no longer be able to present the content because the two computing devices are no longer in proximity to each other.

In step 320 of FIG. 9, first computing device 12 requests the public key for second computing device 14. In step 322, second computing device 14 will send its public key. In step 324, first computing device 12 will decrypt the content key stored in its black box using the private key for first computing device 12. At step 326, first computing device 12 will encrypt the content key using the public key for second computing device 14. In step 328, first computing device 12 will send the encrypted content key to second computing device 14. In one embodiment, first computing device 12 will verify that the two devices are still in proximity before sending the encrypted content key to second computing device 14. In step 330, second computing device 14 will decrypt the received content key using the private key from second computing device 14. In step 332, second computing device 14 will store the decrypted content key in its black box. In some embodiments, the content key will be stored in a black box prior to decryption and only decrypted at the very last moment prior to using it to decrypt the content. Steps 320-332 of FIG. 9 are the same as in FIG. 8. In step 380, second computing device 14 will decrypt a portion of the content using the content key. The first time that step 380 is performed for a particular item of content, the first portion of content will be decrypted. In step 382, the second computing device 14 will play the decrypted portion of content. In step 384, second computing device 14 will determine if first computing device 12 is still in proximity with second computing device 14. If they are still in proximity (step 386), then the process will loop back to step 380 and second computing device 14 will decrypt the next portion of content using the content key. The loop of steps 380-386 will continue until the content has completed. If the devices are no longer in proximity (step 386) to each other, then at step 388 second computing device 14 will stop presenting the content, delete the content key and delete any decrypted content in step 388. In one embodiment, at regular intervals during playback, the second device will add a visible watermark to the playback image. The watermark should clearly show the identity of the individual sharing the content from the first computing device. This will make user of the first computing device aware of the trust he is being given to share his content with devices that aren't his. And if the second computing device is untrustworthy and attempts to save the content for later redistribution, the source of the leak is known.

Figure 10:
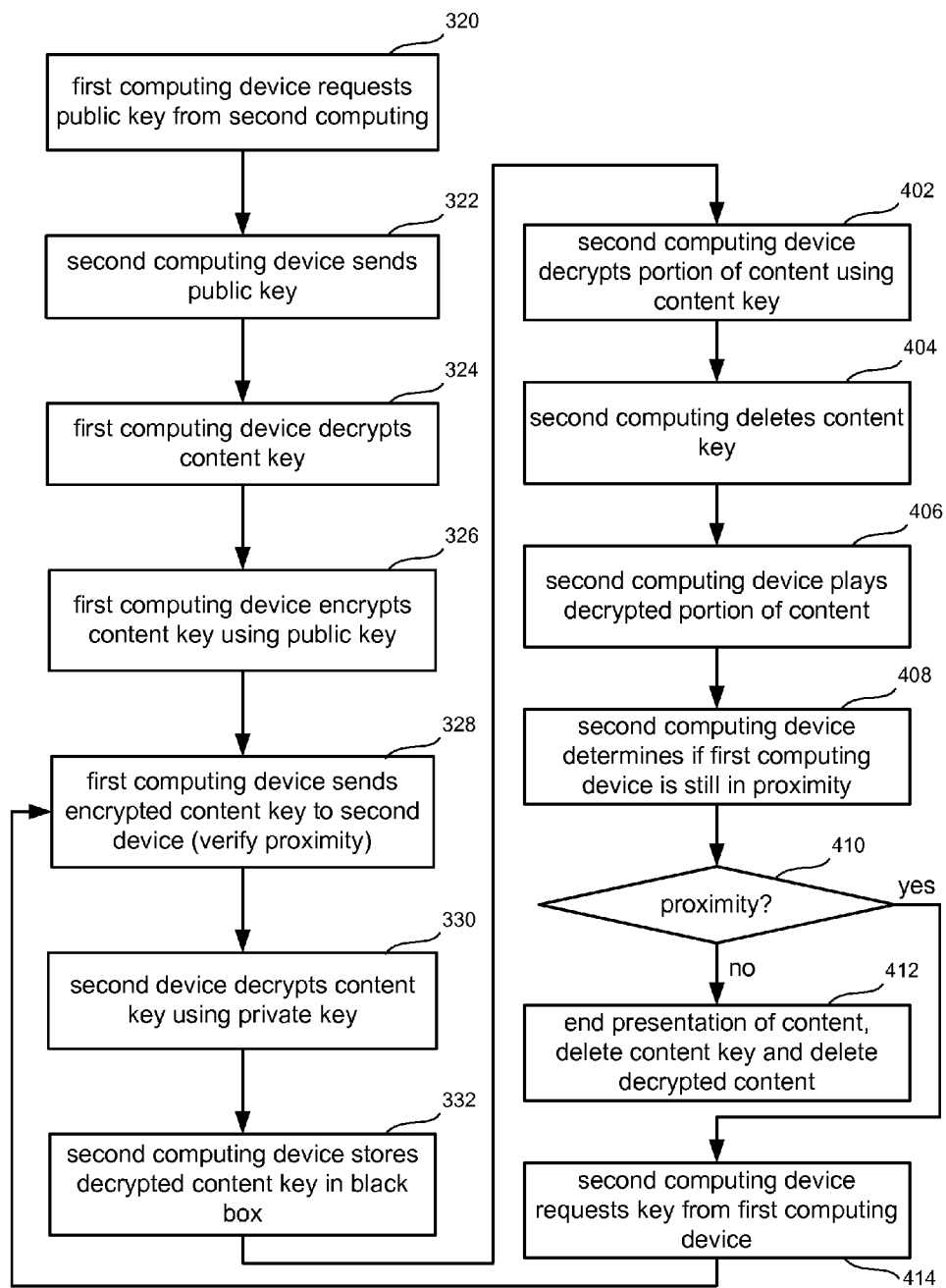
FIG. 10 is a flow chart describing one embodiment of a process for playing content based on a license associated with a device in proximity.

FIG. 10 describes another embodiment of step 88 of FIG. 12 in which the second computing device will delete the content key after decrypting each portion of the content. In this manner, second computing device 14 will need to request a content key for each portion of content and that content key will only be provided if the device is still in proximity. Steps 320-332 of FIG. 10 are the same as in FIG. 8. After step 332, the process continues to step 402, in which second computing device 14 will decrypt the next portion of content using the content key stored at second computing device 14. In step 404, second computing device 14 will delete the content key from its black box (and anywhere else on second computing device 14). In step 406, second computing device 14 will play the decrypted portion of the content (decrypted in the latest iteration of step 402). In step 408, second computing device will determine if the first computing device is still in proximity with it. If not, then in step 412, second computing device 14 will end the presentation of content, delete the content key and delete any encrypted content. In effect, the second computing device is losing the right to access the content and will no longer be able to present the content. If, however, the two devices are still in proximity (step 410), then second computing device 14 will request the content key (again) from first computing device 12 in step 414. After step 414, the process loops back to step 328 and first computing device 12 will send the encrypted content key to second computing device 14. The process will then continue from step 328, as depicted in FIG. 10.

FIG. 11 is a flow chart describing another embodiment of step 88 of FIG. 2 that includes using a cyclically changing key. In step 450 of FIG. 11, first computing device 12 requests second computing device 14 to send its public key to first computing device 12. In step 452, second computing device 14 will send its public key to first computing device. In this embodiment, the content will include multiple keys. For example, the content could be provided in sections with each section having its own key. For example, the sections of content can correspond to time periods during a video. Step 454 includes the first computing device decrypting all the content keys for the content. In step 456, the first computing device will encrypt one of the content keys using the public key for second computing device 14. In one example, one of the multiple content keys will be identified as a current content key. For example, the content key can be the content key associated with the current portion of the content currently or about to be played by second computing device 14. Thus, in step 486, first computing device will encrypt the current content key. In step 458, first computing device 12 will send the encrypted current content key to a second computing device 14. In some embodiments, first computing device 12 will verify that it is still within proximity of second computing device 14 prior to sending the current content key to the second computing device 14. In step 460, second computing device 14 decrypts the received current content key using the private key for second computing device 14. In step 462, second computing device 14 stores the decrypted current content key in its black box. In step 464, second computing device 14 will decrypt a portion of the content associated with the current content key using the current content key. In step 466, second computing device 14 deletes the current content key from its black box, and anywhere else on second computing device 14. In step 468, second computing device plays the decrypted portion of the content that is associated with the current content key it just deleted.

In step 470, second computing device 14 determines if the first computing device is still in proximity. If the two devices are no longer in proximity (see step 472), then second computing device 14 will end the presentation of the content and delete any decrypted content in step 474. The current content key was already deleted. If the devices are still in proximity with each other (step 472), then in step 476, the second computing device 14 will request the next content key from first computing device 12. After step 476, the process of FIG. 11 loops back to step 456 and the first computing device 12 will encrypt the next current content key using the public key for second computing device 14. After step 456, the process will continue at step 458 as depicted in FIG. 11. Thus there is a loop of steps 456-470 which is repeated for all the portions of content until there are no more portions of content left to play or the computing devices are no longer in proximity. In the alternative, first computing device can decrypt all the content keys in step 454, prior to the loop, and just send the different content keys for each iteration of the loop of steps 456-470.

FIG. 12 depicts a flow chart describing other embodiments of step 88 of FIG. 2 in which second computing device 14 receives the content key directly from Licensing Service 16. In step 510 of FIG. 12, second computing device 14 requests the content key directly from Licensing Service 16 by sending a communication to Licensing Service 16 via cloud 10. In this embodiment, it is assumed that Proximity Server 20 was used to determine whether first computing device 12 is in proximity to second computing device 14 in response to each of the computing devices setting their positional data to proximity server 12 as described above. Therefore, in step 512, Licensing Service 16 will send a request asking Proximity Server 20 to verify that first computing device 12 is within proximity of second computing device 14. In step 514, Proximity Server 20 will respond to Licensing Service 16 indicating whether the two computing devices are within proximity of each other. It is assumed that Proximity Server 20 already made the determination of whether the two computing devices were in proximity based on the positional data sent to proximity server 20 prior to the process of FIG. 12 or concurrently with the process of FIG. 12. If it is determined that the two computing devices are not within proximity of each other (step 516), then Licensing Service 16 will deny the request from second computing device 14 for the content key in step 518.

If the two devices are in proximity to each other (step 516), then Licensing Service 16 will respond to the request from second computing device 14 with the one or more content keys using any other methods described herein. For example, FIGS. 8-11 provide different embodiments for providing the content key from first computing device 12 to second computing device 14. Each of those four flow charts can be adapted such that they describe the behavior of Licensing Service 16 sending the content key to second computing device 14. For example, in the flow charts of FIGS. 8-11, Licensing Service 16 can perform the steps depicted as being performed by first computing device 12. That is, Licensing Service 16 can send the key once for the content, multiple times for different portions of the content or send different keys for different portions of the content. Other embodiments can also be performed.

FIG. 13 describes another embodiment of step 88 of FIG. 2 in which Licensing Service 16 will send the content key to second computing device 14 in response to proof from second computing device 14 that it is in proximity with first computing device 12. For example, in step 630, second computing device 14 will request credentials or a certificate from first computing device 12. The credentials could include log-in credentials (user name/password), pin, shared secret, etc. Alternatively, a certificate can be requested. The certificate can be any type of secure certificate known in the art suitable for the particular implementation. In step 632, first computing device 12 will send the credentials or certificate to the second computing device only if the two computing devices are within proximity of each other. Therefore, the reception of the credentials and/or certificate is evidence of proximity. In step 634, second computing device 14 will request a content key or multiple content keys (from Licensing Service 16). The request for the content key will include a presentation of the credentials and/or certificate. In step 636, the Licensing Service 16 will verify the credentials and/or certificate. If the credentials and/or certificate are verified, then in step 638, licensing service 16 will respond to request from second computing device 14 with the one or more content keys using any of the methods described herein. Step 638 of FIG. 13 is similar to step 520 of FIG. 12, and includes a licensing server providing keys using any of the techniques described in FIGS. 8-11. Another approach might be to have the server issue a challenge to the second computing device, in which the second computing device must get the first computing device to sign and return the result. The server could periodically ask the second computing device to resign something. This way the certificate never leaves the first computing device.

One embodiment includes computing devices which, having established a relationship can use the history of that relationship to fast track re-connection. For example, person A goes to person B's house and they both watch a movie on person B's television based on that television being in proximity to person A's cell phone using one of the methods described above. Before the movie ends person A leaves the house with their cell phone, therefore, the connection is broken but the television saves information about the connection. There is a history stored on the television such that when person A return's to person B's house, person B's television can instantly detect person A's cell phone and offer us the option of connecting again. There is also the possibility that through preferences, person A or B can wipe the relationship—and make sure to leave no residue behind.

Figure 14:
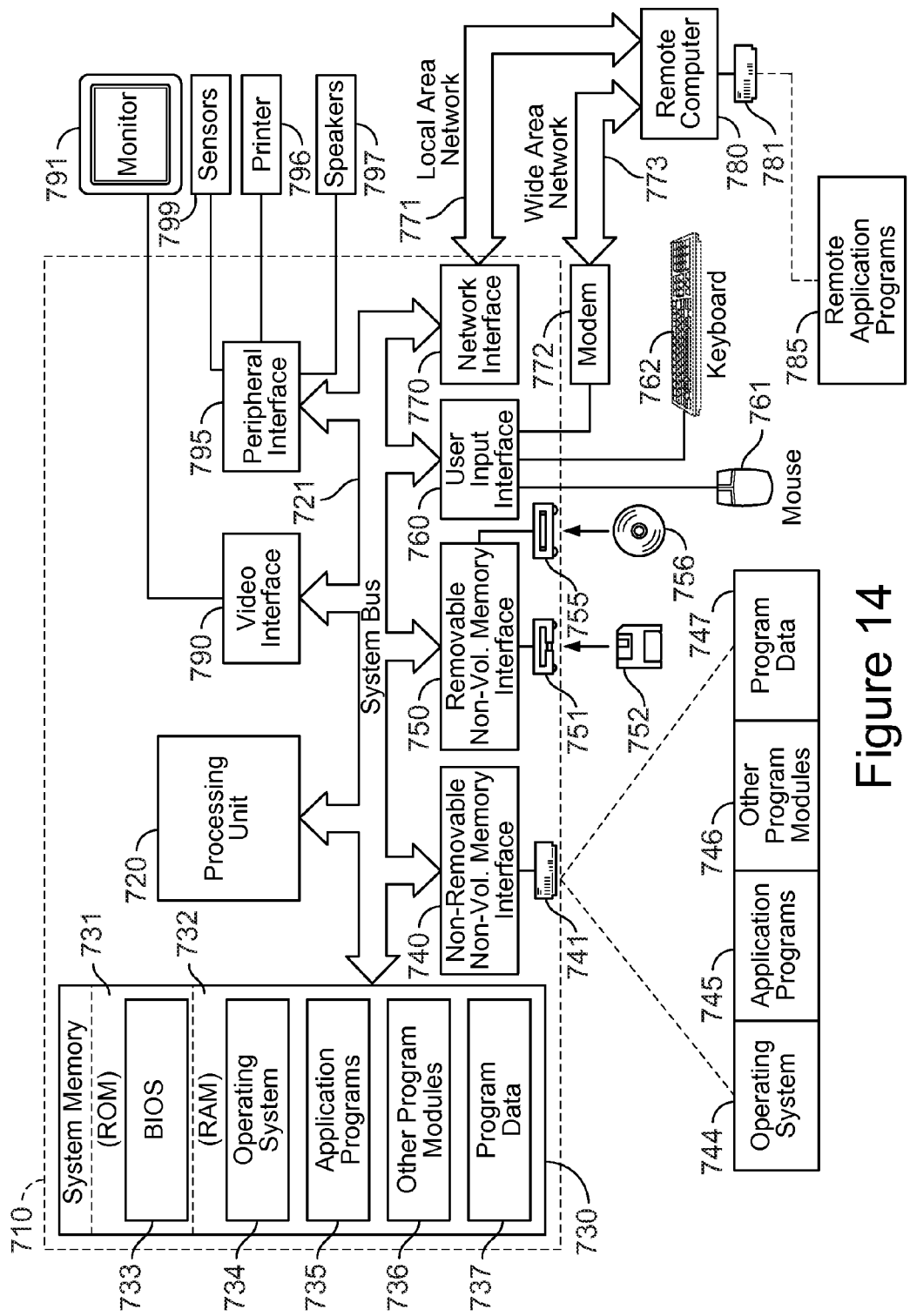
FIG. 14 is a block diagram depicting one example of a computing system that can be used to implement the computing devices described herein.

FIG. 14 depicts an exemplary computing system 710 for implementing any of the devices of FIG. 1. Computing system 710 of FIG. 14 can be used to perform the functions described in FIGS. 2-13. Components of computing system 710 may include, but are not limited to, a processing unit 720 (one or more processors that can perform the processes described herein), a system memory 730 (that can stored code to program the one or more processors to perform the processes described herein), and a system bus 721 that couples various system components including the system memory to the processing unit 720. The system bus 721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, and PCI Express.

Computing system 710 typically includes a variety of computer readable media. Computer readable media can be any available media that can be accessed by computing system 710 and includes both volatile and nonvolatile media, removable and non-removable media, including RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computing system 710.

The system memory 730 includes computer storage media in the form of volatile and/or nonvolatile memory such as read only memory (ROM) 731 and random access memory (RAM) 732. A basic input/output system 733 (BIOS), containing the basic routines that help to transfer information between elements within computer 710, such as during start-up, is typically stored in ROM 731. RAM 732 typically contains data and/or program modules that are immediately accessible to and/or presently being operated on by processing unit 720. By way of example, and not limitation, FIG. 14 illustrates operating system 734, application programs 735, other program modules 736, and program data 737.

Computing system 710 may also include other removable/non-removable, volatile/nonvolatile computer storage media. By way of example only, FIG. 14 illustrates a hard disk drive 740 that reads from or writes to non-removable, nonvolatile magnetic media, a magnetic disk drive 351 that reads from or writes to a removable, nonvolatile magnetic disk 752, and an optical disk drive 755 that reads from or writes to a removable, nonvolatile optical disk 756 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 741 is typically connected to the system bus 721 through an non-removable memory interface such as interface 740, and magnetic disk drive 751 and optical disk drive 755 are typically connected to the system bus 721 by a removable memory interface, such as interface 750.

The drives and their associated computer storage media discussed above and illustrated in FIG. 14, provide storage of computer readable instructions, data structures, program modules and other data for the computing system 710. In FIG. 14, for example, hard disk drive 741 is illustrated as storing operating system 344, application programs 745, other program modules 746, and program data 747. Note that these components can either be the same as or different from operating system 734, application programs 735, other program modules 736, and program data 737. Operating system 744, application programs 745, other program modules 746, and program data 747 are given different numbers here to illustrate that, at a minimum, they are different copies. A user may enter commands and information into the computer through input devices such as a keyboard 762 and pointing device 761, commonly referred to as a mouse, trackball or touch pad. Other input devices (not shown) may include a microphone, joystick, game pad, satellite dish, scanner, Bluetooth transceiver, WiFi transceiver, GPS receiver, or the like. These and other input devices are often connected to the processing unit 720 through a user input interface 760 that is coupled to the system bus, but may be connected by other interface and bus structures, such as a parallel port, game port or a universal serial bus (USB). A monitor 791 or other type of display device is also connected to the system bus 721 via an interface, such as a video interface 790. In addition to the monitor, computers may also include other peripheral devices such as printer 796, speakers 797 and sensors 799 which may be connected through a peripheral interface 795. Sensors 799 can be any of the sensors mentioned above including Bluetooth receiver (or transceiver), microphone, still camera, video camera, depth camera, GPS receiver, WiFi transceiver, etc.

Computing system 710 may operate in a networked environment using logical connections to one or more remote computers, such as a remote computer 780. The remote computer 780 may be a personal computer, a server, a router, a network PC, a peer device or other common network node, and typically includes many or all of the elements described above relative to the computing system 710, although only a memory storage device 781 has been illustrated in FIG. 14. The logical connections depicted in FIG. 14 include a local area network (LAN) 771 and a wide area network (WAN) 773, but may also include other networks. Such networking environments are commonplace in offices, enterprise-wide computer networks, intranets and the Internet.

When used in a LAN networking environment, the computer system 710 is connected to the LAN 771 through a network interface or adapter 770. When used in a WAN networking environment, the computing system 710 typically includes a modem 772 or other means for establishing communications over the WAN 773, such as the Internet. The modem 772, which may be internal or external, may be connected to the system bus 721 via the user input interface 760, or other appropriate mechanism. In a networked environment, program modules depicted relative to the computing system 710, or portions thereof, may be stored in the remote memory storage device. By way of example, and not limitation, FIG. 14 illustrates remote application programs 785 as residing on memory device 781. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It is intended that the scope of the invention be defined by the claims appended hereto.

We claim:

1. A method for presenting restricted content based on a first computing device being in proximity to a second computing device, comprising:
    obtaining the restricted content at the second computing device;
    determining that the second computing device is in proximity to the first computing device, the determining that the second computing device is in proximity to the first computing device comprises determining that the second computing device is within a predefined distance of the first computing device based on GPS location information associated with the second computing device;
    receiving a right to access the restricted content at the second computing device in response to the second computing device being in proximity to the first computing device, the receiving a right to access the restricted content at the second computing device includes receiving the right to access the restricted content in response to the determining that the second computing device is within the predefined distance of the first computing device; and
    presenting the restricted content using the second computing device based on the right to access the restricted content.

2. The method of claim 1, further comprising:
    losing the right to access the restricted content at the second computing device subsequent to the receiving a right to access the restricted content in response to the second computing device no longer being in proximity to the first computing device.

3. The method of claim 1, wherein:
    the first computing device is operating in association with a user identity for a first user and the second computing device is operating in association with a user identity for a second user that is a different person than the first user.

4. The method of claim 1, wherein:
    the receiving a right to access the restricted content includes the second computing device providing a public key for the second computing device to the first computing device, receiving a content key that is encrypted based on the public key from the first computing device, decrypting the content key based on a private key for the second computing device that is associated with the public key and using the decrypted content key to decrypt the restricted content.

5. The method of claim 1, wherein:
    the receiving a right to access the restricted content includes the second computing device providing a public key for the second computing device to the first computing device, receiving a first content key that is encrypted based on the public key from the first computing device for a first portion of the restricted content, decrypting the first content key based on a private key for the second computing device that is associated with the public key, using the decrypted first content key to decrypt the first portion of the restricted content, receiving a second content key that is encrypted based on the public key from the first computing device for a second portion of the restricted content only if the first computing device is in proximity to the second computing device, decrypting the second content key based on the private key for the second computing device that is associated with the public key and using the decrypted second content key to decrypt the second portion of the restricted content.

6. The method of claim 1, wherein:
    the receiving a right to access the restricted content includes the second computing device providing a public key for the second computing device to the first computing device, receiving a content key that is encrypted based on the public key from the first computing device, decrypting the content key based on a private key for the second computing device that is associated with the public key, using the decrypted content key to decrypt a first portion of the restricted content, verifying whether the first computing device is still in proximity to the second computing device, deleting the decrypted content key if the first computing device is not in proximity to the second computing device, using the decrypted content key to decrypt a second portion of the restricted content if the first computing device is still in proximity to the second computing device.

7. The method of claim 1, wherein:
    the receiving a right to access the restricted content includes the second computing device providing a public key for the second computing device to the first computing device, receiving a content key that is encrypted based on the public key, decrypting the content key based on a private key for the second computing device that is associated with the public key, using the decrypted content key to decrypt a first portion of the restricted content, deleting the decrypted content key in response to decrypting the first portion of the encrypted content, requesting and receiving the encrypted content key after the deleting of the decrypted content key, decrypting the content key, and using the decrypted content key to decrypt a second portion of the restricted content.

8. The method of claim 1, further comprising:
    receiving verification information at the second computing device from the first computing device; and
    presenting the verification information to a server, the receiving a right to access the restricted content at the second computing device includes receiving a key at the second computing device from the server, the second computing device uses the key to decrypt the restricted content.

9. The method of claim 1, further comprising:
    wirelessly sensing positional information at the second computing device;
    transmitting the positional information from the second computing device to a server; and receiving an indication at the second computing device that the second computing device is in proximity to the first computing device based on the transmitted positional information.

10. The method of claim 1, wherein:

the second computing device is not physically connected to the first computing device;

the obtaining the restricted content includes downloading encrypted content;

the receiving a right to access the restricted content includes the second computing device providing a public key for the second computing device to the first computing device, receiving a content key that is encrypted based on the public key from the first computing device, decrypting the content key based on a private key for the second computing device that is associated with the public key and using the decrypted content key to decrypt the encrypted content; and the method further comprises losing the right to access the restricted content at the second computing device and no longer being able to present the restricted content using the second computing device in response to the second computing device no longer being in proximity to within the predefined distance of the first computing device.

11. One or more processor readable storage devices having processor readable code stored thereon, the processor readable code for programming one or more processors to perform a method comprising:

acquiring a right to access content at a first computing device, the right to access the content comprises a first content key associated with a first time period of the content and a second content key associated with a second time period of the content different from the first time period of the content, the first content key is different from the second content key;

identifying that the first computing device is in proximity to a second computing device at a first point in time;

providing the first content key to the second computing device in response to the identifying that the first computing device is in proximity to a second computing device at a first point in time;

identifying that the first computing device is in proximity to the second computing device at a second point in time subsequent to the first point in time; and providing the second content key to the second computing device in response to the identifying that the first computing device is in proximity to the second computing device at a second point in time.

12. One or more processor readable storage devices according to claim 11, wherein:

the first computing device is associated with a first user and the second computing device is associated with a second user different from the first user.

13. One or more processor readable storage devices according to claim 11, wherein the identifying that the first computing device is in proximity to the second computing device at a first point in time comprises:

sensing positional data using one or more sensors; and determining whether the first computing device is in proximity to the second computing device based on the positional data.

14. One or more processor readable storage devices according to claim 11, wherein the method further comprises:

removing the right to access the content to the second computing device when the first computing device is no longer within a predefined distance of the second computing device; and automatically regaining the right to access the content to the second computing device when the first computing device comes within the predefined distance of the second computing device.

15. A system for presenting content, comprising:

a first computing device, the first computing device acquires a right to access content, the right to access the content comprises a first content key associated with a first time period of the content and a second content key associated with a second time period of the content different from the first time period of the content, the first content key is different from the second content key; and a second computing device, the second computing device receives the first content key in response to the first computing device being within a predefined distance of the second computing device at a first point in time, the second computing device receives the second content key in response to the first computing device being within the predefined distance of the second computing device at a second point in time subsequent to the first point in time, the second computing device accesses the content using the first content key prior to receiving the second content key.

16. A system according to claim 15, further comprising:

a licensing server, the first computing device acquires the right to access content from the licensing server; and a proximity server, the second computing device transmits positional data to the proximity server and the proximity server determines whether the first computing device is within the predefined distance of the second computing device based on the positional data from the second computing device, the proximity server communicates to the licensing server whether the first computing device is within the predefined distance of the second computing device, the licensing server sends data embodying the right to access the content to the second computing device in response to the proximity server communicating to the licensing server that the first computing device is within the predefined distance of the second computing device.

17. A system according to claim 15, wherein:

the second computing device adds a watermark to the content to identify a user of the first computing device.

18. A system according to claim 15, wherein:

the second computing device loses access to the content in response to the first computing device no longer being in proximity to the second computing device.

19. A system according to claim 15, wherein:

the first computing device is not physically connected to the second computing device.

* * * * *